INVENTORS
NATHAN WEINER
IRVING MARCUS

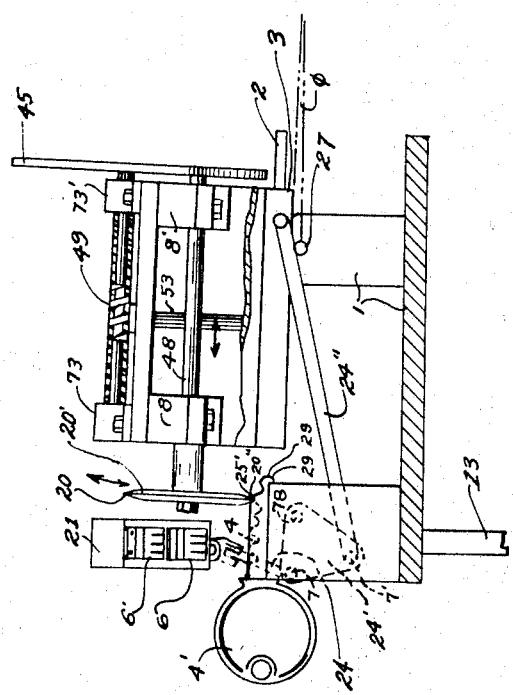
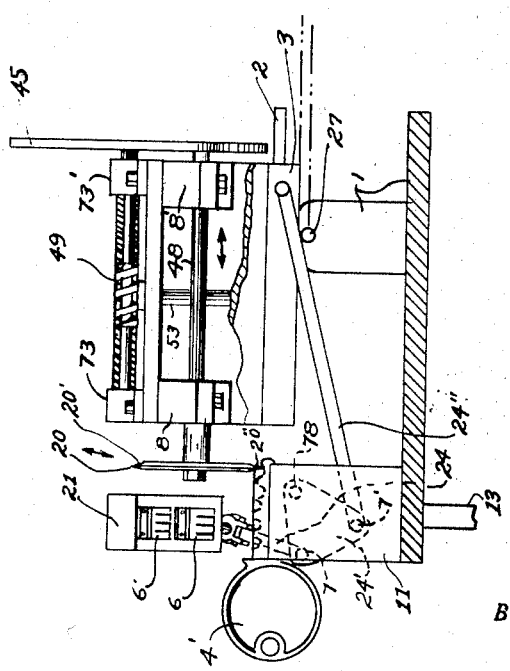
INVENTOR.
NATHAN WEINER
IRVING MARCUS
BY
ATTORNEYS

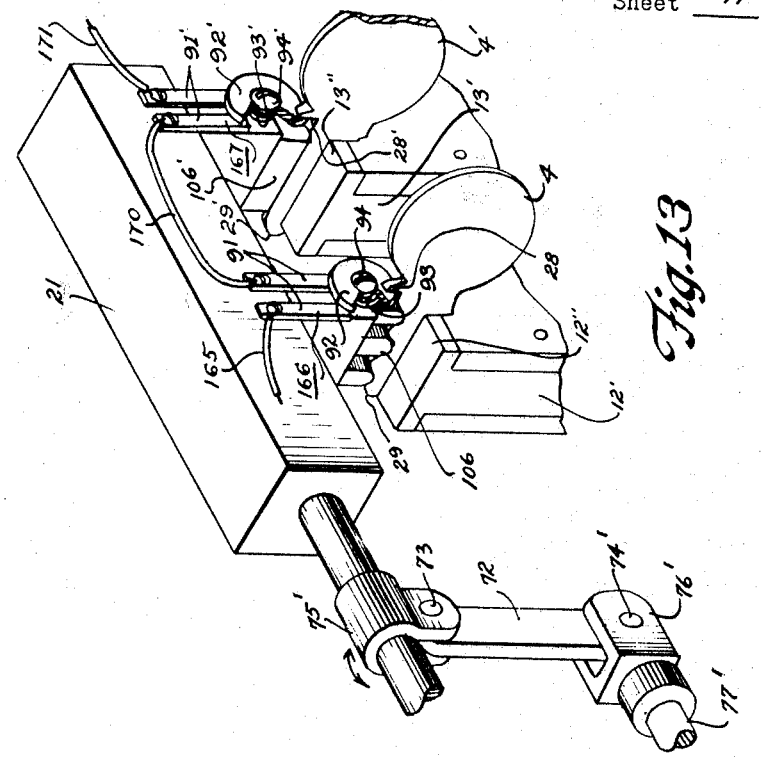

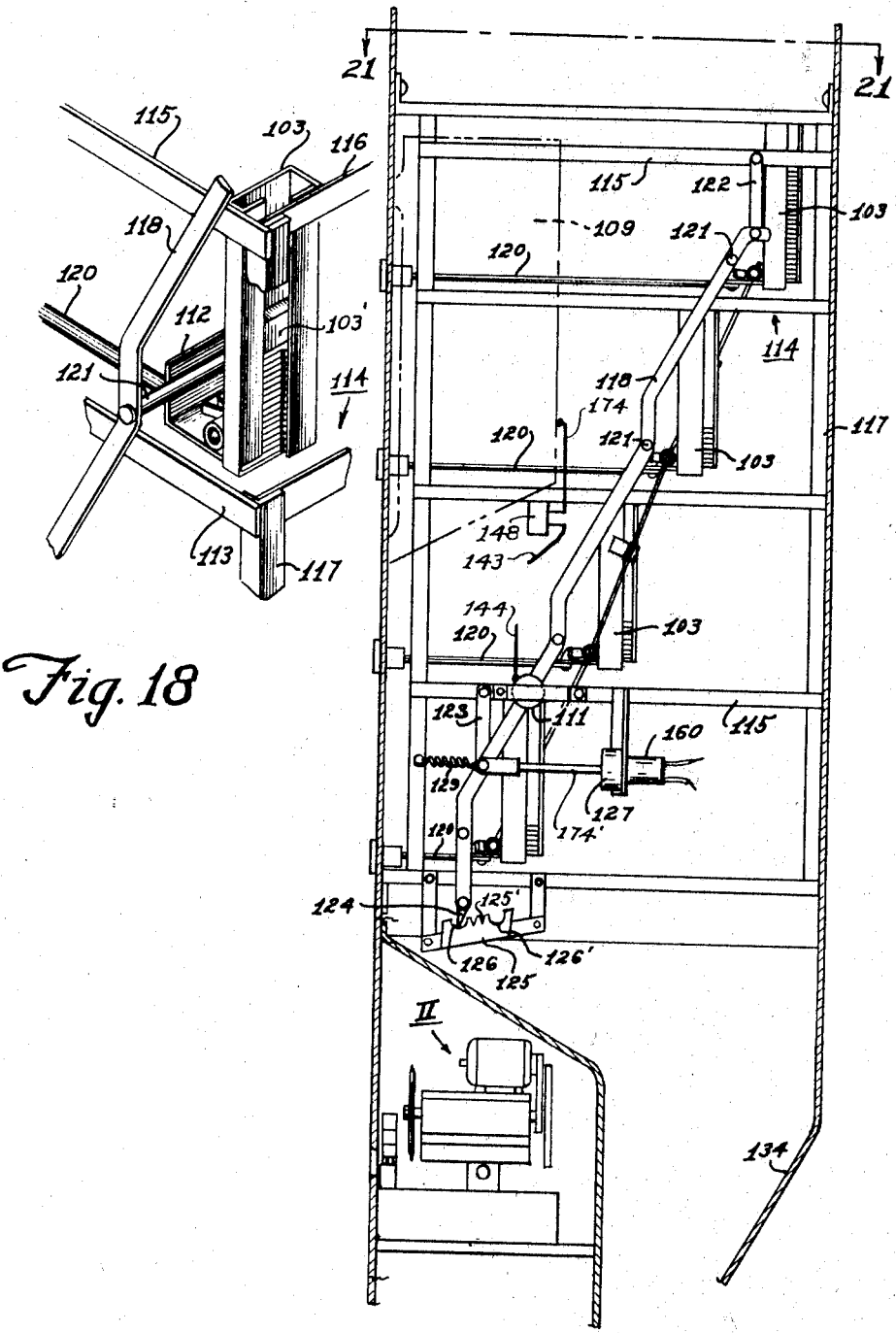

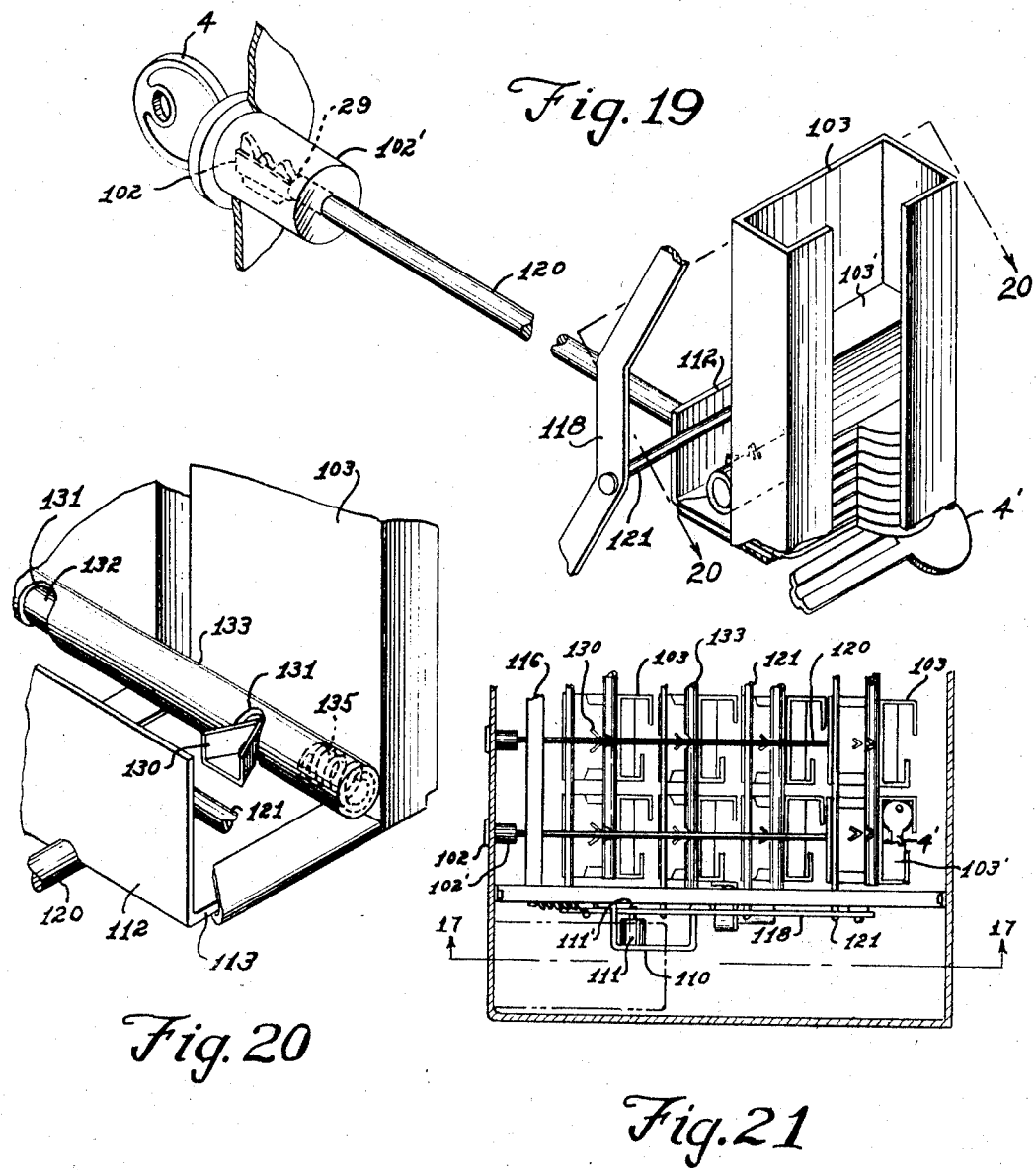

United States Patent Office 3,442,174
Patented May 6, 1969

3,442,174
KEY-BLANK DISPENSER-AND-CUTTER APPARATUS
Nathan Weiner, Swampscott, and Irving Marcus, Arlington, Mass., assignors to Vend-A-Key Corporation, Skokie, Ill., a corporation of Delaware
Filed Nov. 24, 1961, Ser. No. 154,412
Int. Cl. B23c 1/16
U.S. Cl. 90—13.05                                    16 Claims

ABSTRACT OF THE DISCLOSURE

This disclosure deals with a novel combined key blank dispenser and cutter apparatus having means for rendering the appropriate key accessible and automatically, when in position, effecting contouring of the same to cut an appropriate blank.

---

The present invention relates to key-blank dispenser-and-cutter apparatus and more particularly to coin- controlled apparatus of this character.

A very extensive use of a wide variety of keys has resulted in a large market for duplicate keys. Following the trend toward vending-type apparatus, it has been proposed to incorporate in vending apparatus key-blank dispensing means and key-blank cutter means, each of which may be independently operated by the customer. In accordance with a feature of the present invention, however, such operation is rendered dependent, so that the dispenser and cutter apparatus operate, in combination, and not as separate, independent units, to render the cutter effective under the control of the same coin that renders the dispenser effective.

It is, therefore, an object of the present invention to provide a novel cooperative combination of a key-blank dispenser and a key-blank cutter, operable in response to a single coin-controlled means.

A further object is to provide a new and improved key-blank dispenser that is particularly adapted for use in the dispenser-and-cutter apparatus of the present invention.

An addtional object is to provide a novel key-blank cutter, also particularly adapted for use in the said dispenser-and-cutter apparatus of the invention.

Other and further objects will become evident upon reference to the following description and will be more particularly pointed out in the appended claims.

In brief summary, from one of the broad points of view, the objects of the invention are attained in a key-blank dispenser-and-cutter apparatus having, in combination, a key-blank container, normally ineffective key-blank-removal means cooperative with the container and that, when rendered effective, is actuated to remove a key blank from the container, means for rendering the key-blank-removal means effective, a normally ineffective key-blank-cutter apparatus that, when rendered effective, is actuated to contour the removed key blank, and mean connected with and controlled by the effective key-blank-removal means for thereupon rendering the contouring apparatus effective.

The invention will now be described in connection with the accompanying drawings, in which, FIG. 1 is a perspective of a key-blank dispenser-and-cutter apparatus embodying the present invention;

FIGS. 8 and 9 are section side views of the key-blank-cutter apparatus;

FIG. 12 is a perspective of a still further reciprocating mechanism.

FIG. 13 is a perspective showing, in detail, a mechanism of the key-blank-cutter apparatus for holding a key and a key blank in the preliminary stages of the cutting operation and a means for effecting release of the holding mechanism;

FIG. 17 is a partial view of the key-blank dispenser of the present invention taken upon the line 17—17 in FIG. 21 and looking in the direction of the arrows, the embodiment shown therein being that shown in FIG. 14;

FIGS. 18, 19 and 20 are perspectives showing, in detail, portions of the key-blank dispenser;

FIG. 21 is a partial view taken upon the line 21—21 in FIG. 17 and looking in the direction of the arrows.

Keys may be made by contouring a relatively small number of different-shaped key blanks. It has been found, for purposes of the present invention, that approximately eighty-five percent of the keys presently in use may be duplicated by contouring forty-eight different-shaped key blanks. A key-blank dispenser-and-cutter apparatus, as shown at I in FIG. 1, serves as a source of key blanks and as a means for contouring the key blanks to the desired outline. Many of the details have been omitted from FIG. 1 so that it will not be unduly complicated, and reference may be made to other of the figures for these details. The term "contour," or variations thereof, is used herein to denote the outline of a key when viewed along a line orthogonal to the flat plane thereof, and the term "shape," or variations thereof, is used herein to denote the outline of a key or key blank when viewed from the small or forward end, longitudinally thereof.

Figure 2:
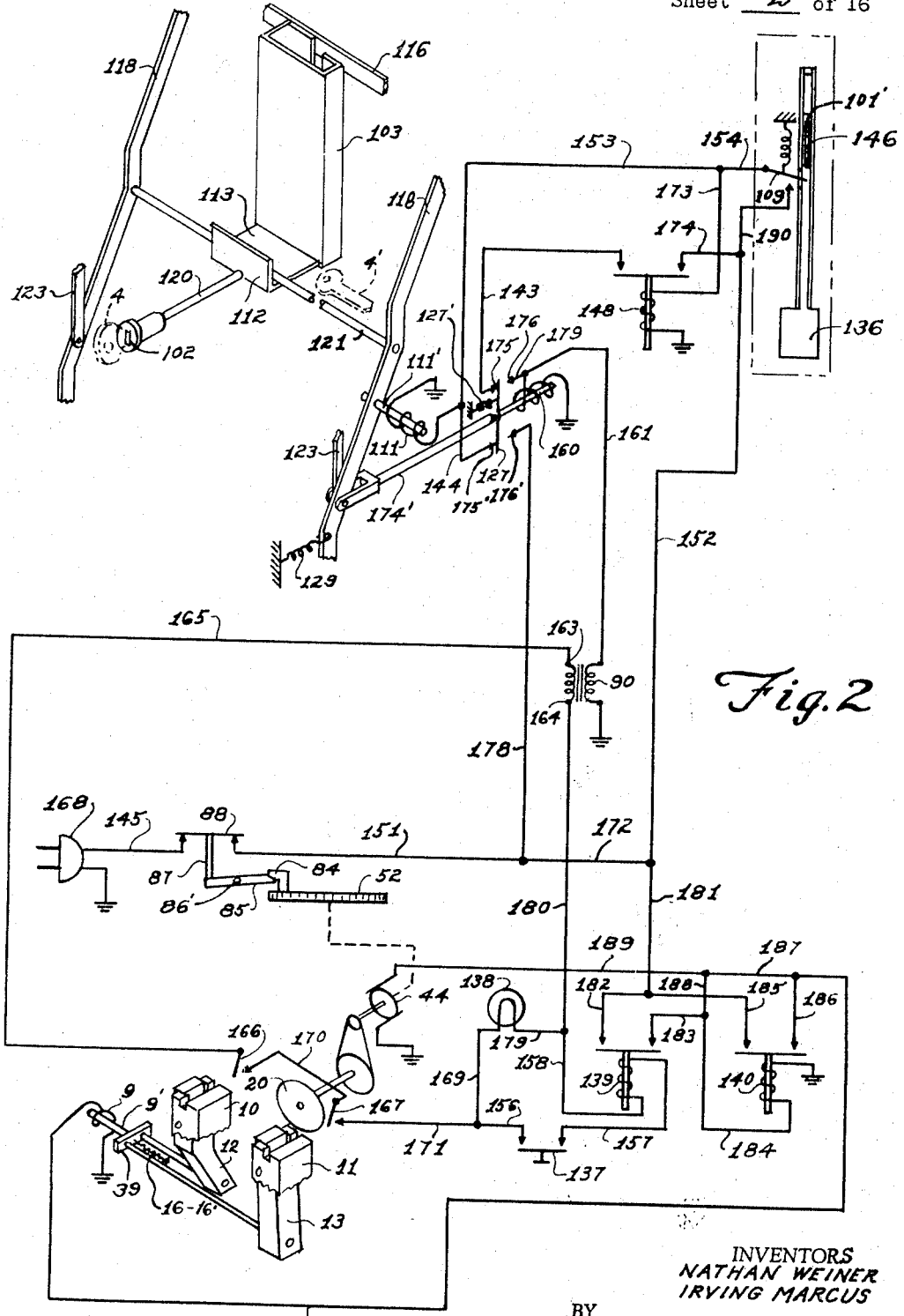
FIG. 2 is a schematic diagram of a preferred circuit for controlling the operation of the dispenser-and-cutter apparatus of the invention.

In order to obtain a key blank 4', as shown in FIG. 2, from the key-blank dispenser-and-cutter or vending apparatus I, a person may insert a coin 146 into a coin 146 into a slot 101' and a key 4 into a slot 102 of the same shape as the key 4. Forward movement of the key 4 results in the ejection of a key blank 4' shaped similarly to the key 4, in a manner to be explained fully hereinafter, the key blank 4' being recovered at a receptacle 135. The forward movement of the key 4 also renders effective a normally ineffective key-blank-contouring or key-blank-cutter apparatus, shown generally at II, by the use of a switch 127, the operation of which will be considered in greater detail later in the specification. Contouring of the thus ejected key blank 4' to the contour of the key 4 may then be effected by use of the key-blank-cutter apparatus II. To accomplish this, the key is inserted into a slot 104 and the key blank 4' is inserted into a slot 104' and, all in a manner to be explained hereinafter, a handle 36 is forced downward setting into operation the key-blank-cutter apparatus II which proceeds thereafter, automatically, to cut the key blank 4' to the contour of the key 4. Thus a person seeking to duplicate an existing key may, by the use of the vending apparatus of the present invention, obtain a key blank to match the shape of the existing key and may, further, contour the key blank to the outline of the existing key. The apparatus is rendered effective, both in the dispenser and cutter portions thereof, in response to a coin, which makes it valuable as a sales tool consistent with current marketing practices.

In order to aid in the understanding of the operation of the key-blank-cutter apparatus II, it will now be described in brief in overall operation, in connection with FIGS. 3 through 13 and 15 and 16, with a more detailed description to follow hereinafter. The key 4 and the key blank 4' upon being inserted into the slots 104 and 104' are received by a pair of longitudinally extending vises 10 and 11, respectively, disposed in a pair of parallel planes. Resilient members or fingers 6 and 6' disposed transversely to the vises apply a pressure to the tops of the key 4 and key blank 4', respectively, prior to the time that the vises 10 and 11 are locked, in a manner to be described, forcing the key 4 and the key blank 4' securely against the bottom surfaces of notches 18 and 19, respectively. A follower 25 is disposed transversely to the plane of the key-receiving vise 10 and is movable forward and rearward over the top of the same. A cutter wheel 20 is disposed and rotatable in a plane transverse to the plane of the key-blank-receiving vise 11 and is movable longitudinally forward and rearward over the same. The vises are locked and forward movement of the follower 25 and the cutter wheel 20 in unison is effected, in a manner to be hereinafter described, and, as the follower and cutter wheel move forward, the resilient members 6 and 6' are moved away from the tops of the key 4 and the key blank 4', and the follower 25 moves over the undulating top surface of the key 4 effecting like undulating movement of the cutter wheel 20 which cuts the key blank 4' to the contour of the key 4. After having reached the farthest point of forward travel, the follower 25 and the cutter wheel 20 proceed rearward over the same undulating path, the resilient members 6 and 6' are re-applied to the tops of the key 4 and key blank 4', and the vises are thereafter unlocked. The forward surfaces of the vises 10 and 11 lie in one plane so that the forward surfaces may be placed immediately adjacent the front-panel surface of the vending apparatus I, the notches 18 and 19 being located immediately behind the slots 104 and 104', respectively. Further, since the vises 10 and 11 lie in a pair of parallel planes, the use of resilient members or fingers 6 and 6' is possible and this type of finger arrangement, extending transversely of the vises for stabilizing and aligning the key 4 and the key blank 4', secures the key and the key blank in position prior to locking the vises 10 and 11. It will become evident, in the specification hereinafter, that unless the key 4 and the key blank 4' are properly positioned in the key-blank-cutter apparatus II the key blank 4' will not be contoured to the contour of the key 4.

A more detailed description of the key-blank-cutter apparatus II will now be made. The key-blank-cutter apparatus II comprises a base 1, which is secured within the vending apparatus I, a carriage 2 pivotally attached by a shaft 27 to the base 1, and a superstructure 3 thus slidably engaged at 26 and 26' to the carriage 2, the superstructure 3 thus being capable of pivoting movement about the shaft 27 through an angle $\phi$ and of longitudinal movement, forward and rearward, upon the slides 26 and 26'. The cutter wheel 20 is shown attached by a nut 5 to a shaft 48 which is journaled at 8 and 8' to the superstructure 3. The follower 25 is shown secured by bolts 30 to a block 31 which is secured by bolts 32 also to the superstructure 3. At the beginning of a cutting cycle the follower 25 and the cutter wheel 20 are disposed longitudinally rearward, respectively, of the key 4 and the key blank 4'. Longitudinally forward movement of the superstructure 3 is effected, in a manner to be hereinafter described, and the follower 25 and the cutter wheel 20, being secured thereto, move in unison over the vises, as previously mentioned. The follower 25 at its lowermost end 25' contacts the key 4 at 29 during the forward movement, and, simultaneously, the cutter wheel 20 at its lowermost end 20'' contacts the key blank 4' at 29'. The follower, upon continued forward (and then rearward) movement, raises or lowers as it proceeds over the undulating upper surface of the key 4, indicated generally by the arrows z, effecting thereby, as shown in FIGS. 8 and 9, a pivoting, through an angle $\phi$ about the shaft 27, of the carriage 2 from a substantially horizontal position, as shown in FIG. 8, to an inclined position, as shown in FIG. 9. A motor 44, by a belt 45 and pulleys 46' and 46, effects rotation of the cutter wheel 20 which proceeds forward and then rearward, pivoting up or down in response to the like movement of the follower 25, and a cutter wheel abrading surface 20' removes metal from the key blank 4' thereby cutting or contouring the key blank 4' to the outline of the key 4. A spring 79 effects continuous contact between the follower 25 and the cutter wheel 20 and the key 4 and the key blank 4', respectively. Positioning of the follower 25, to effect contact thereof with the key at 29 simultaneously with the instant of contact of the cutter 20 with the key blank at 29', is accomplished longitudinally by loosening the bolts 32 and changing the position of the block 31, as allowed by elongated apertures 33, and vertically by loosening the bolts 30 and adjusting the follower 25 upward or downward, as is required, to insure that the contour of the properly positioned key blank 4', when cut, will match the contour of the key 4. Further, the follower 25 and the cutter wheel 20 are so positioned, relative to the shaft 27, that movement of the follower 25 about the shaft 27 effects an equal movement of the cutter wheel 20.

Figure 3:
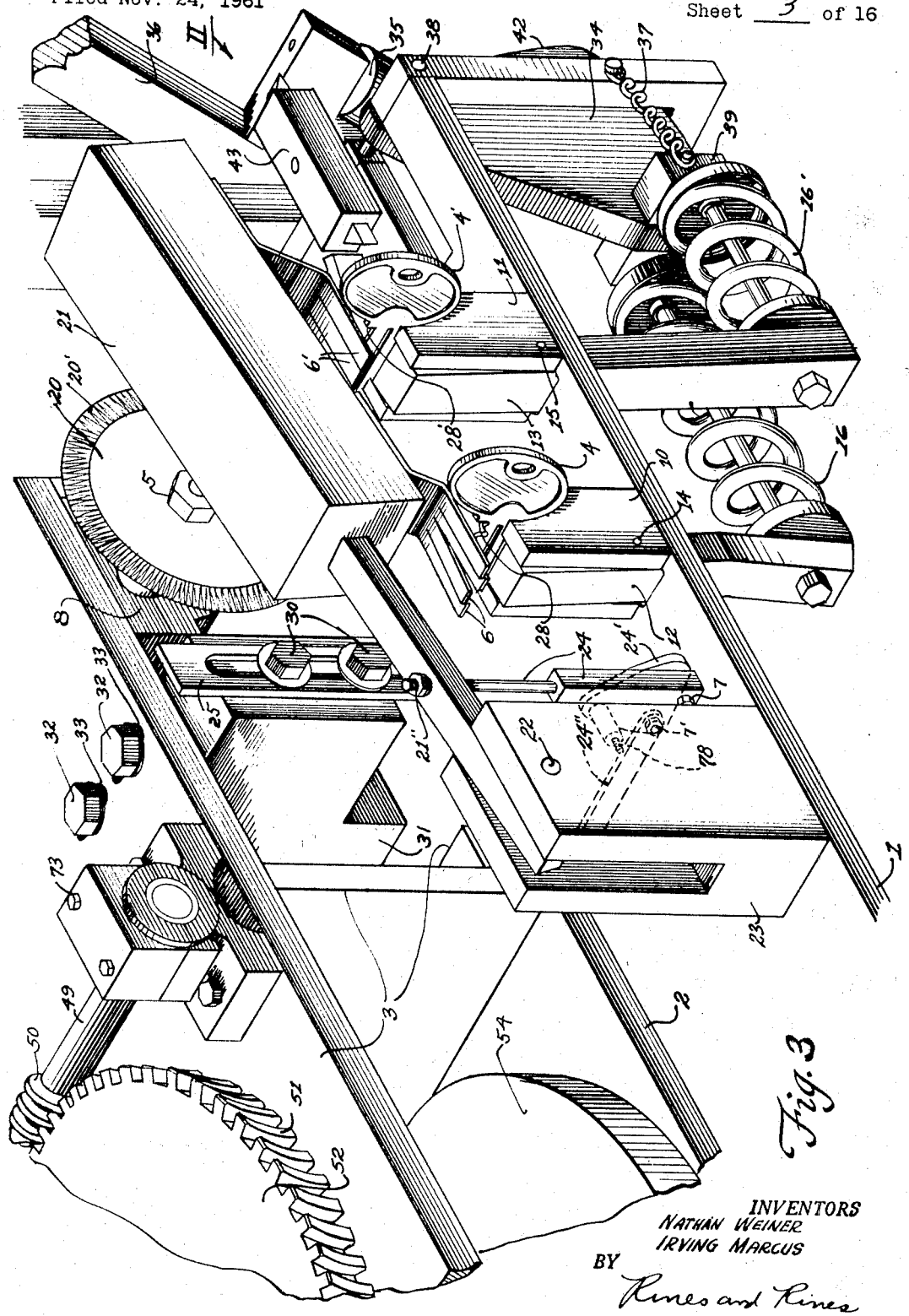
FIGS. 3 and 4 are perspectives, upon an enlarged scale, of portions of a key-blank-cutter apparatus in successive positions of operation.
Figure 4:
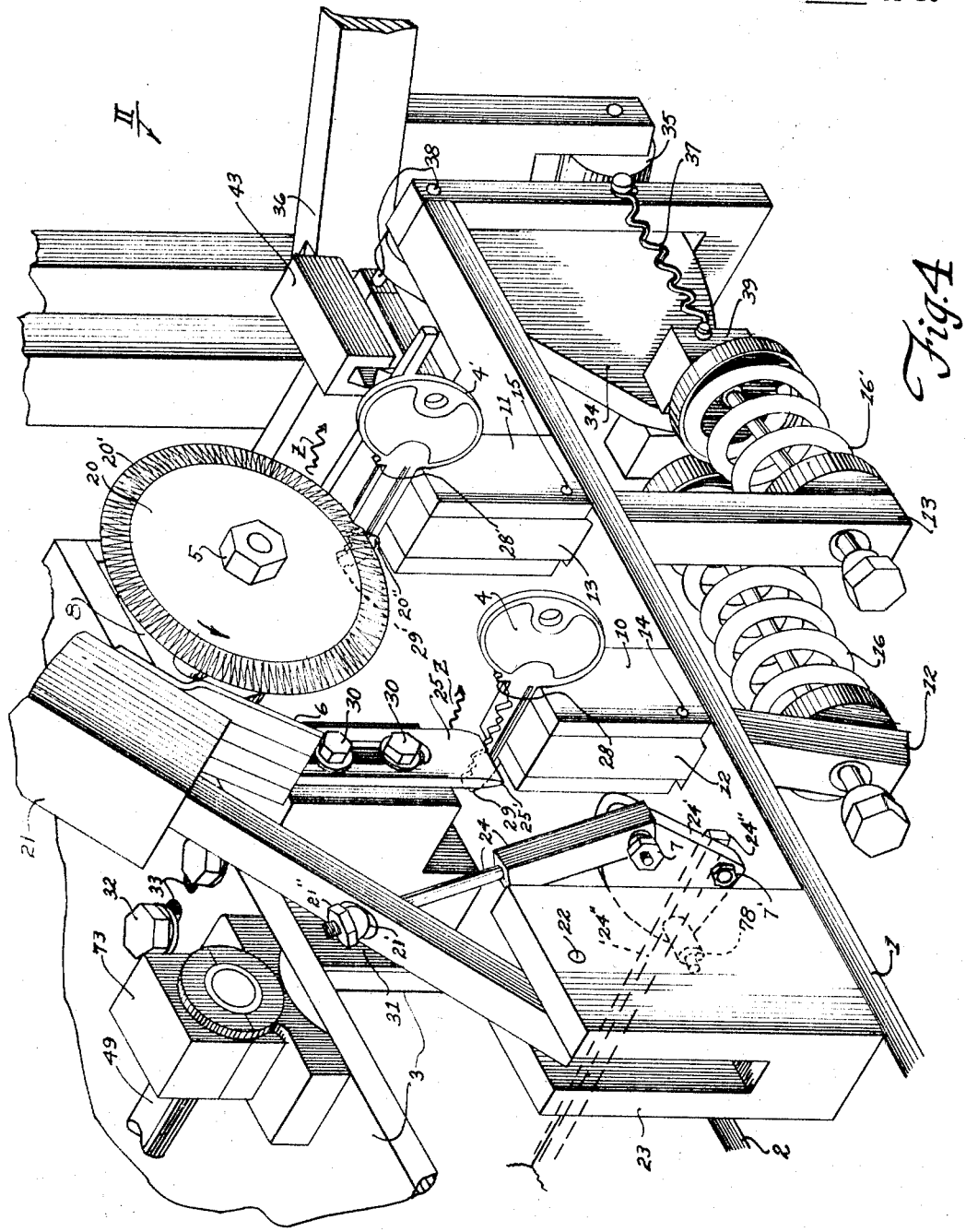
Figure 5:
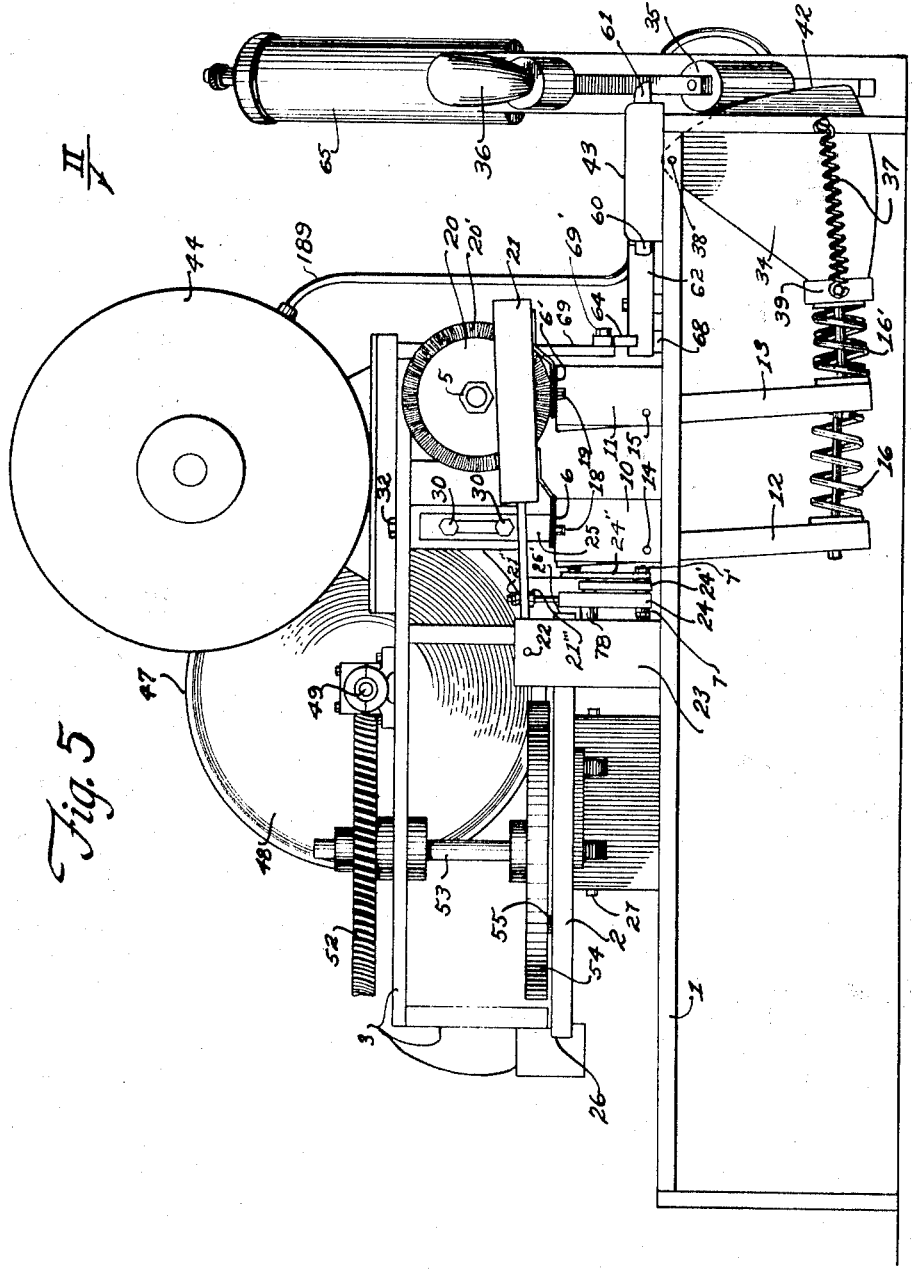
FIGS. 5, 6 and 7 are respectively, front, side and rear views of the same key-blank cutter apparatus.

The fingers 6 and 6' are shown attached to a weight 21 which is pivoted at 22 to a bracket 23, the latter being bolted or otherwise secured to the base 1. The rather massive weight 21 serves to force the fingers 6 and 6' downward against the key 4 and the key blank 4', respectively; however, the main downward force is supplied by a shaft 24 which moves downward in response to movement of a bell crank 24' to which the shaft 24 is pivotally attached at 7, the bell crank 24' being pivotally attached at 78 to the bracket 23. A shaft 24'', pivotally attached at one end to the bell crank 24' at 7' and at the other end to the superstructure 3 at 7'', effects pivoting movement of the bell crank 24' as the superstructure 3 moves longitudinally forward and rearward. The bell crank 24' is so positioned that the resilient fingers 6 and 6' apply a pressure to the key 4 and the key blank 4', respectively, prior to the locking of the vises 10 and 11, in a manner to be explained hereinafter, the fingers being pivotally removed therefrom prior to the cutting of the key blank 4' and being applied again prior to unlocking of the vises. The shaft 24 exerts a force in substantially a vertical direction, up and down, upon the weight 21 by nuts 21''' and 21'', respectively, as shown in FIGS. 3 through 5. The nuts 21''' and 21'' are spaced upon the shaft 24 a distance slightly larger than the thickness of the shaft portion of the weight 21 immediately adjacent thereto to allow a change in the angular relation between the shaft 24 and the weight 21 as the weight 21 pivots upward. Also, in order to permit such a change in angular relation, the perforation, shown at 21', through which the shaft 24 passes, is larger in diameter than the outer diameter of the shaft 24.

An alternate arrangement for pivoting the weight 21 is shown in FIG. 13 wherein a shaft 72, corresponding to the shaft 24 in FIG. 3, is shown pivotally attached at 73 to a bracket 75', which encircles the shaft of the weight 21, and is shown pivotally attached at 74' to a second bracket 76'. A shaft 77' rotatably engages the bracket 76' at one end and at the other end thereof rotatably engages the bell crank 24', not shown in FIG. 13, at 7.

Prior to the removal of the resilient fingers 6 and 6' from the key 4 and the key blank 4', levers 12 and 13 respectively of longitudinal vises 10 and 11 are pivoted at 14 and 15, respectively, in a clockwise direction to lock the vises 10 and 11, respectively, and thus secure the key 4 and the key blank 4' within the notches 18 and 19, in response to the forces of springs 16 and 16', respectively. The springs 16 and 16', shown schematically as return spring 16–16' in FIG. 2, are attached to a two-piece block 39 which, in the embodiment illustrated in FIGS. 3 through 10, is pivotally attached to a cam 34. The cam 34, of course, may be attached directly to the levers 12 and 13; however, the spring arrangement illustrated is a very satisfactory one since it furnishes an adequate locking force at the vises while allowing for wear of the parts thereof. A variation of the levers 12 and 13 is shown at 12' and 13', respectively, in FIG. 13, having broadened engaging portions 12" and 13", respectively, for more secure engagement of the key 4 and the key blank 4".

Figure 1:
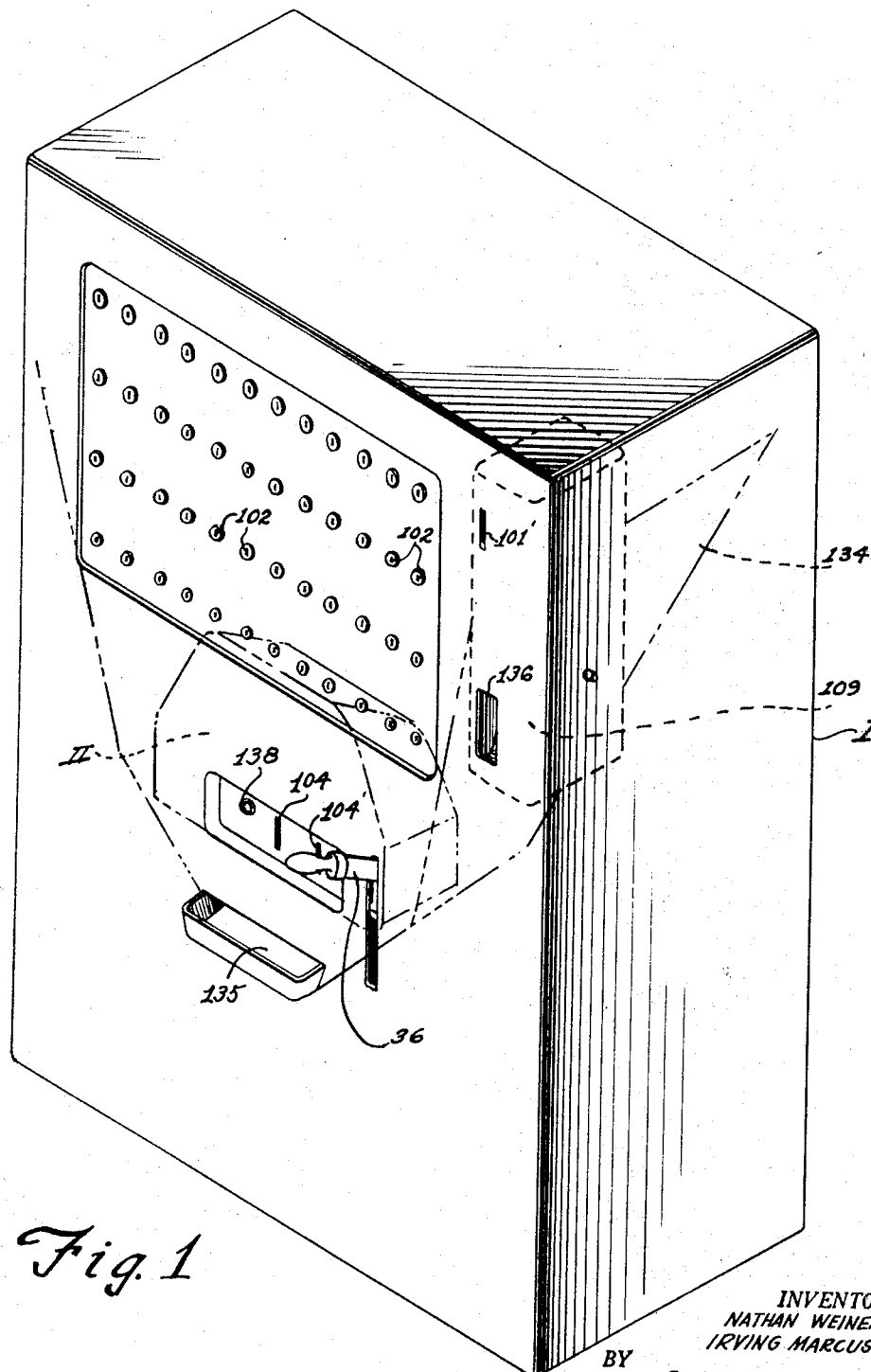

The cam 34 is shown pivotally attached at 38 to the base 1. A force may be exerted upon the cam 34 at 42 by a roller 35 which, as the roller 35 progresses from the position shown in FIG. 3 to the position shown in FIG. 5 and finally to the position shown in FIG. 4 in response to a downward force upon the handle 36, causes the cam 34 to move in a clockwise direction compressing the springs 16 and 16', thereby locking the vises 10 and 11 as heretofore explained. The handle 36, as shown in FIG. 1, extends outward from the vending apparatus I. While the handle 36 has been used here to perform the spring compressing function, it should be kept in mind that other means may be used, and there is hereinafter described one such other means in the form of a solenoid.

Figure 6:
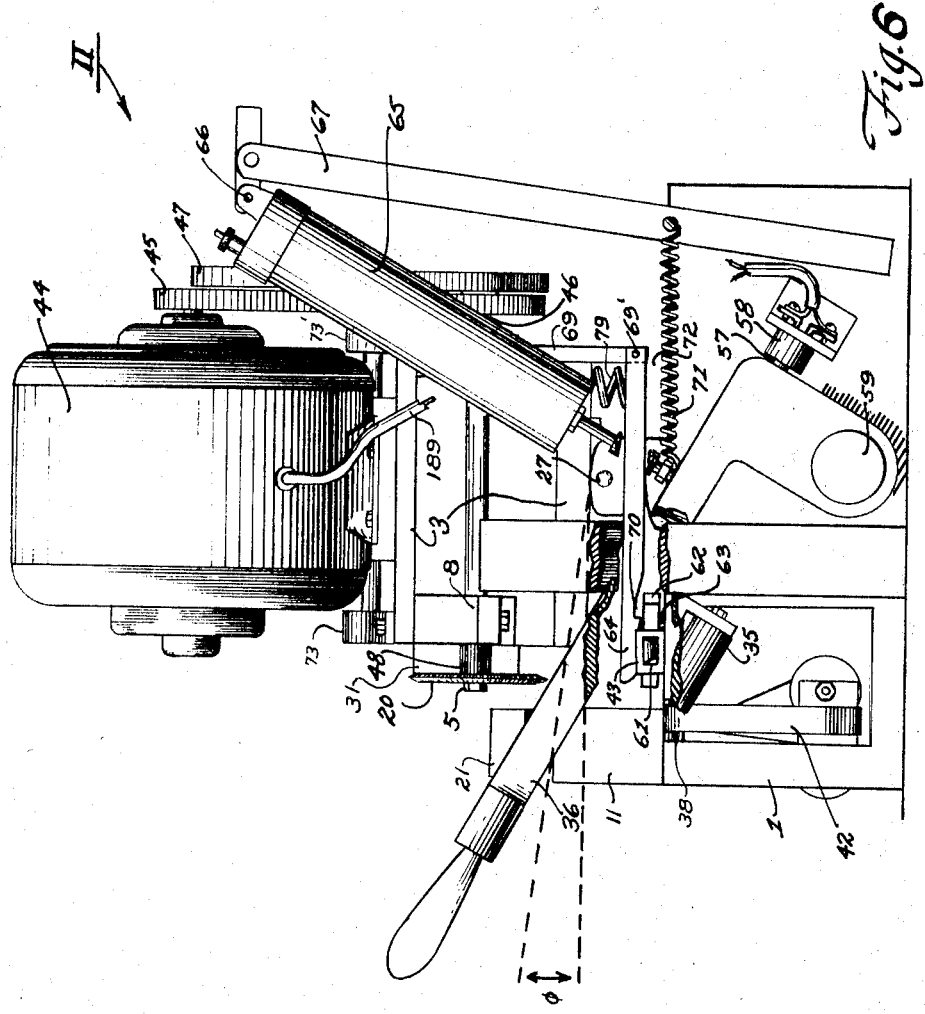
Figure 10:
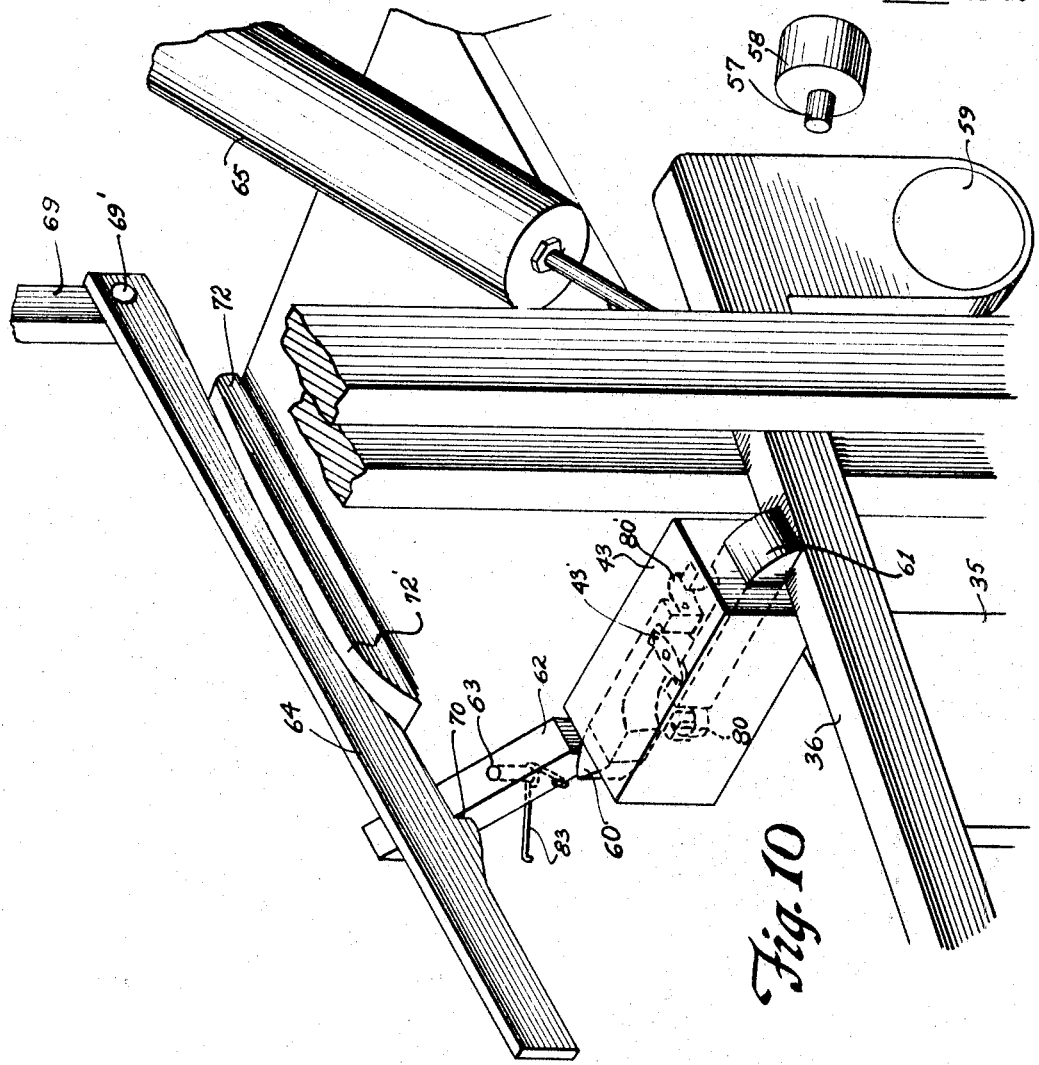
FIG. 10 is a perpective of the portion of the key-blank-cutter apparatus showing in detail a latch mechanism used in one embodiment thereof.
Figure 11:
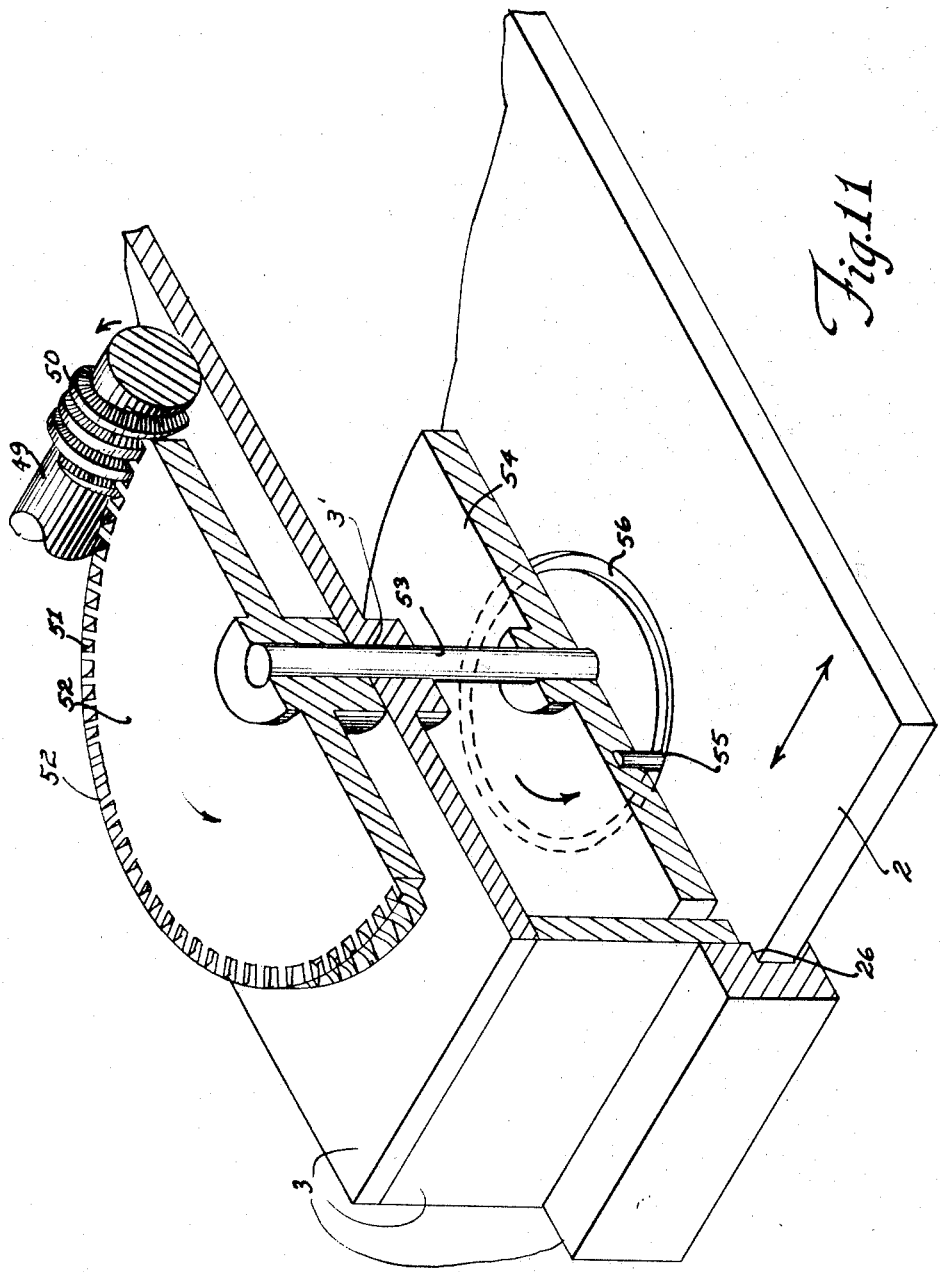
FIG. 11 is a perspective showing, in detail, a reciprocating mechanism of the key-blank-cutter apparatus

The key 4 and the key blank 4' are, when the handle 36 reaches its downward position, firmly held by the vises 10 and 11 and are ready for the contouring operation. The cutter wheel 20 is disposed and rotatable in a plane transverse to the plane of the key-blank-receiving vise 11, as previously described, rotation being effected by an electric motor 44. Electric power to the motor 44 passes through a switch 58 which, when the on-off button 57 thereof is in the out position, as shown in FIG. 10, is closed to allow electric current to pass to the motor through a conductor 189, and, when the button 57 is in the depressed position, as shown in FIG. 6, current to the motor is terminated. The switch 58 may be replaced by a solenoid device as shown, for example, at 140 in FIG. 2. Still other switches may be used in the motor circuit and a complete discussion of these and other of the electrical circuit elements will be made hereinafter in connection with FIG. 2.

The action of the handle 36 has been previously mentioned, and its operation will now be described more fully. A downward force may be applied to the handle 36, as previously mentioned, and it travels downward in response thereto closing the switch 58. The handle 36, in its downward travel, contacts a spring loaded extension 61 disposed at one end of a latch 43. The extension 61, as shown particularly in FIG. 10, is beveled at the top edge thereof and the force exerted thereon by the handle 36 causes the extension 61 to withdraw into the body of the latch 43, thereby allowing the handle 36 to pass in its downward travel, and, after the handle 36 passes, the extension 61 returns to the extended position, restraining the handle 36 in the downward position. The latch 43 has another extension 60, beveled at each vertical edge thereof, disposed at the opposite end of the latch 43 to the extension 61, the latch 43 being so constructed that when either extension 60 or extension 61 is caused to withdraw into the latch body, a pivotally attached member 43' causes the extension disposed at the opposite end thereof to withdraw also. The extensions 60 and 61 are held in a normally extended position by springs 80' and 80, respectively.

Release of the handle 36 is effected in conjunction with rearward longitudinal movement of the superstructure 3. An arm 64, having a notch 70, is shown pivotally attached at 69' to an arm 69 which is secured to the superstructure 3 so that any longitudinal movement of the superstructure is transmitted to the arm 64. When the arm 64 moves longitudinally rearward with the superstructure 3, the notch 70 engages a lever 62 causing it to pivot at 63 engaging the extension 60 and thus effecting a withdrawal of the extension 60 into the body of the latch 43 thereby effecting a withdrawal of the extension 61, as hereinbefore explained, thus relieving the restraint on the handle 36, which, in response to the returning force of the springs 16, 16' and further springs 37 and 71, returns to the upward position, thereby automatically unlocking the vises 10 and 11, and, at the same time, opening the switch 58 to remove power from the motor 44. The arm 64 is narrow at its rearward end adjacent 69 and the lower surface thereof inclines downwardly from the rearward end toward the notch 70. In its rearward travel the inclined lower surface of the arm 64 rides up the upwardly inclined surface 72' of a way 72, attached to the base 1, and at some point the notch 70 disengages the lever 62, the lever 62 returning to its original position in response to the force of a spring 83. The handle 36, in returning to the upward position, is restrained from a precipitous return thereto by a hydraulic cylinder 65 pivotally attached to the upper surface of the handle 36 and pivotally attached at 66 to an arm 67 which is rigidly secured to the base 1.

Figure 7:
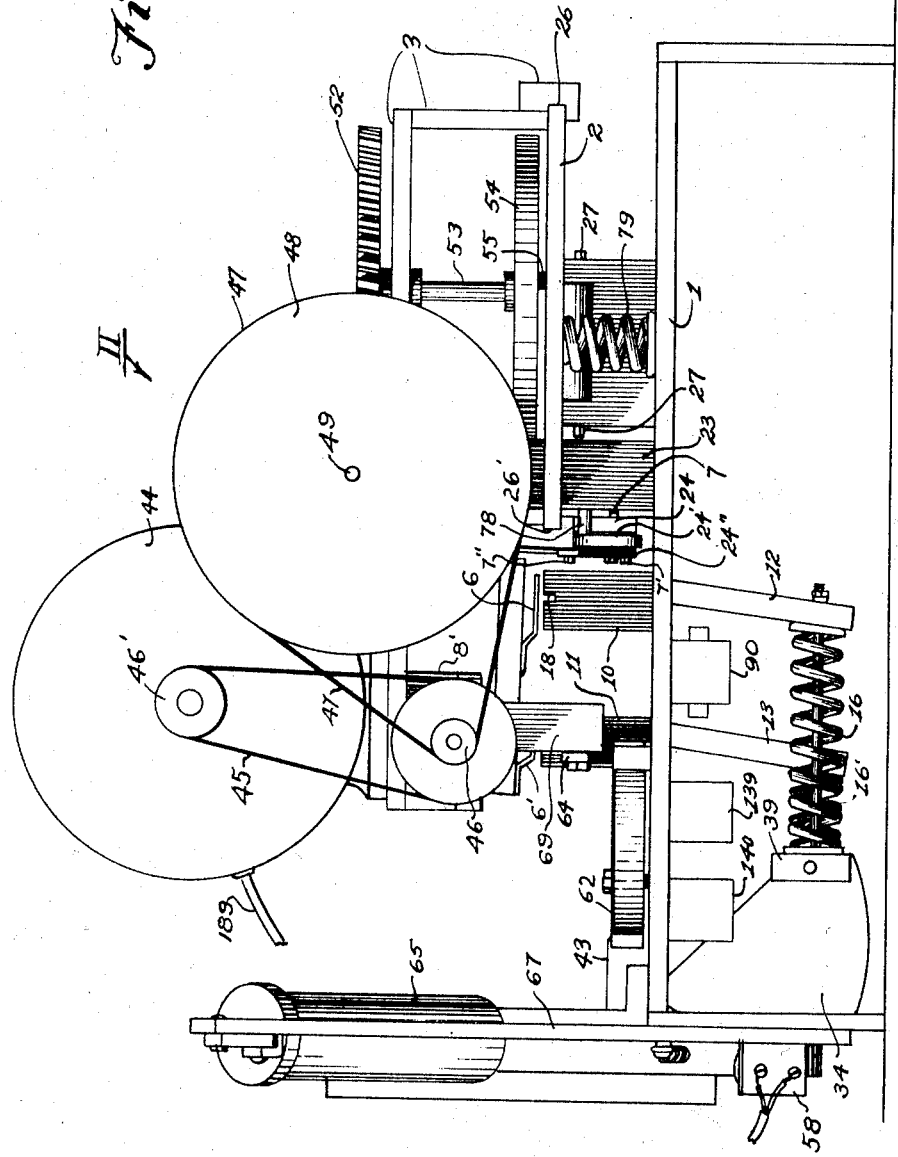

It has been privously mentioned that the superstructure 3 may be caused to move longitudinally in a reciprocating fashion riding upon the bearing surfaces 26 and 26' of the carrier 2. The force which effects this longitudinal movement may be supplied by the cam action of a pin 55 and an annular groove 56, the groove 56 being in the carriage 2 and the pin 55 transmitting the force therefrom through a disk 54 to a shaft 53 to which the disk 54 is rotatably bound and thence to the superstructure 3, at the bearing surface of an aperture 3' therein, through which the shaft 53 extends. The peripheral shape of the groove 56 is elliptical, the short axis of the ellipse being parallel to the line of travel of the superstructure 3. The shaft 53 is rotatable; rotation thereof being effected by a gear 52 secured thereto, the teeth 51' of which contact a worm gear 50. The worm gear 50 is rotatably bound to a shaft 49, the shaft 49 being journaled to bearings 73 and 73', as is shown in FIGS. 8 and 9. Rotational force to the shaft 49 is furnished by a pulley 48, as shown in FIG. 7. The pulley 48 may be rotated in response to the force of a continuous belt 47 which is connected to the pulley 46, the latter, as has been noted herein, being driven by the motor 44.

An alternate means for obtaining the longitudinal movement of the superstructure 3 is shown in FIG. 12 wherein an arm 76, rotatably bound to the shaft 53, will rotate when the shaft 53 rotates, in the manner previously described, and a second arm 74, pivotally attached at 77 to the arm 76 and pivotally attached at the opposite end thereof at 75 to the carrier 2, converts the rotation of the arm 76 to a linear force which pulls the superstructure 3 forward as the arm 76 rotates through 180° from the position shown in FIG. 12 and pushes the superstructure 3 rearward as the arm 76 rotates from this latter position back toward the position shown in FIG. 12, the reacting points being at 75 upon the carrier 2 and at the bearing surface of the aperture 3' upon the superstructure 3.

The compression of the springs 16 and 16' may be effected by means other than the cam 34. One such other means is shown, for example, in FIGS. 15 and 16 wherein the cam 34 and related apparatus are replaced by a solenoid 9 having a shaft 9' attached to the block 39. When the solenoid is energized, in a manner to be hereinafter described, the shaft 9' withdraws compressing the springs 16 and 16' much in the same manner as hereinbefore described. In the embodiment shown in FIGS. 15 and 16, attachment of the springs 16 and 16' to the block 39 is by way of different-lengthened elongated rods (only one is visible) in order that the springs 16 and 16' may be of the same length. The solenoid 9 may be one which introduces a pushing force rather than a pulling force, as in the case of the solenoid 9 shown, and would, in this latter instance, be oppositely disposed to the springs 16 and 16'.

In any key duplicating device, proper relative positioning of the key and the key blank within the key-blank-cutter mechanism II is essential to insure that the key blank, when cut, will duplicate the key. As has been previously mentioned, the key 4 and the key blank 4' are held firmly against the lower surfaces of the notches 18 and 19 by resilient fingers 6 and 6', respectively—alternate resilient means 106 and 106', as shown in FIG. 13, may be used— and, as shown in FIG. 13, proper relative positioning or alignment of the key 4 and the key blank 4' is insured by a pair of switches shown at 166 and 167. When the key 4 and the key blank 4' are inserted into the slots 104 and 104', as previously mentioned, shoulders 28 and 28' of the key 4 and the key blank 4', respectively, contact conductive disks 92 and 92', respectively, causing the disks 92 and 92' to move forward to short circuit respectively conductors 91 and 91', thus closing switches 166 and 167, respectively. And, since the switches 166 and 167 must be closed to effect operation of the key-blank-cutter II, as will be shown in connection with FIG. 2, proper positioning of the key and the key blank is assured prior to the contouring operation. The disks 92 and 92' are held in place by bolts 94 and 94', respectively, and springs 93 and 93' respectively keep the conductive disks 92 and 92' normally out of contact with the conductors 91 and 91', respectively. It may be appreciated that the construction of switches 166 and 167 may differ from the embodiment of FIG. 13 and, indeed, a modification thereof is shown schematically in FIG. 2 wherein two single-pole, single-throw switches are illustrated. And further, the conductive disks 92 and 92' have an insulating surface adjacent the shoulder 28 and 28', respectively, to prevent short-circuiting of the electric circuit.

A brief explanation of the method of obtaining a key blank 4' from the device of the present invention was made previously and a more detailed explanation will now be made. The key blanks 4', as shown in FIGS. 17, 18 and 21, are stored in vertical stacks within a plurality of containers 103 which are arranged in lateral rows longitudinally and vertically displaced from one another. Thus a large number of different shaped key blanks may be stored in a relatively small volume. A key blank 4' may be forced therefrom by a key-blank removal means 112 having a flat bottom plate 113 which passes beneath the forward wall of the container 103 through a slot, not shown, in response to a substantially horizontal force thereon by a rod 120 attached to the key-blank-removal means 112, and, being of thickness substantially equal to or slightly less than the key blank 4', the flat bottom plate 113 forces one key blank 4' from the container 103, as shown, for example, in FIG. 19. The ejected key blank 4' drops down a chute 134 to the receptacle 135.

Figure 22:
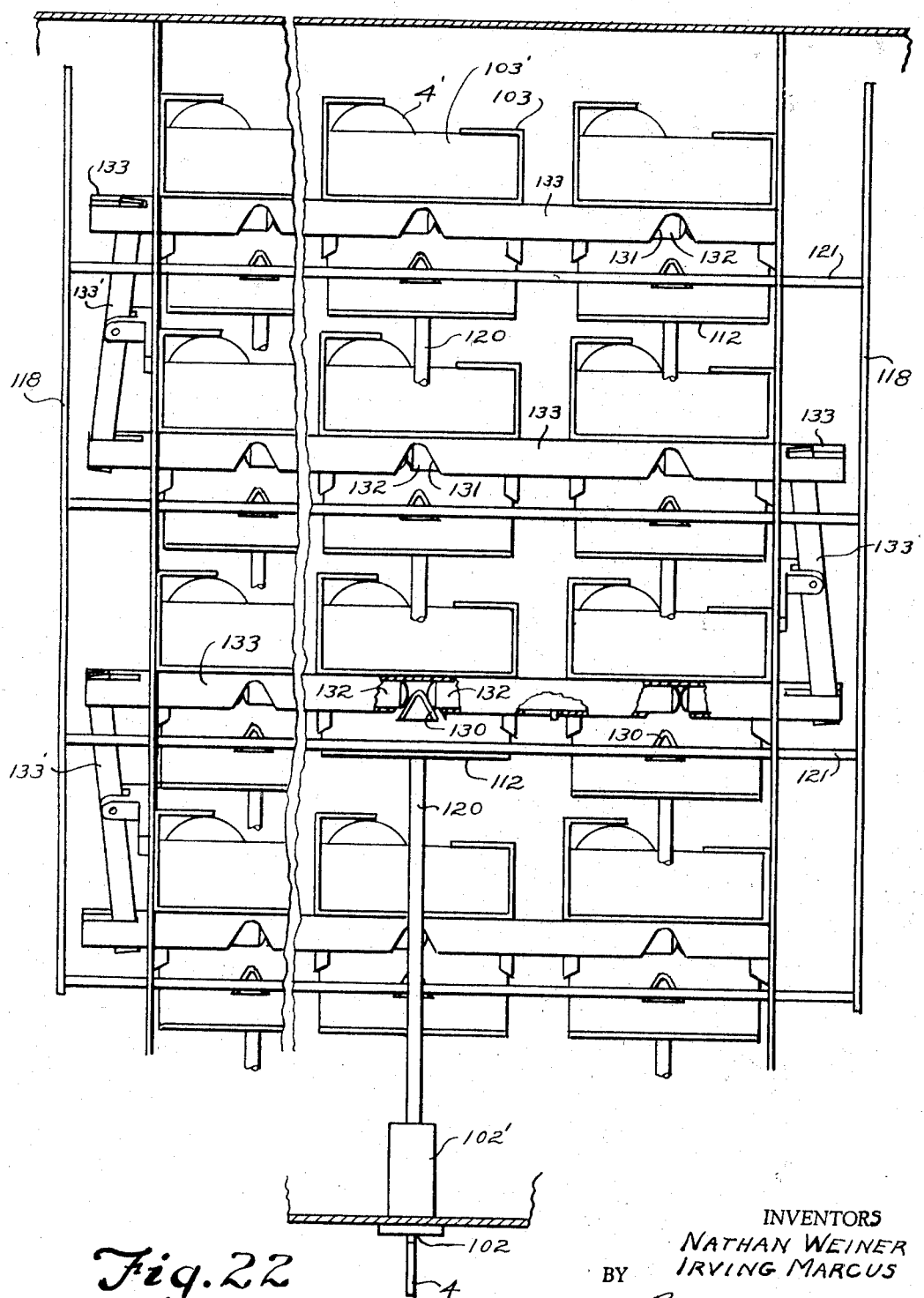
FIG. 22 is a partial section top view of the key-blank dispenser.

The key-blank-removal means 112 is normally ineffective to remove a key blank 4' from a container 103, being rendered ineffective, as will be hereinafter disclosed, by a solenoid 111. It is rendered effective, in the described apparatus, by the momentary closing of switch 109 to permit energization of the solenoid 111 from a power source, not shown. Forty-eight different shaped key blanks 4' are made available in the apparatus of the present invention illustrated herein, although, of course, other quantities may be accommodated by a mere change in size of the apparatus. Therefore, in the illustrated apparatus of the present invention there will be forty-eight containers 103, and forty-eight rods 120, etc. The containers 103 as shown in FIGS. 17 and 18, are attached to a frame 114 that comprises longitudinal members 115, lateral members 116 and vertical members 117, the frame members being welded or otherwise secured together. A pair of inclined bars 118 (only one is visible in FIG. 17, the other being displaced laterally therefrom and being attached to the opposite longitudinal members of the frame 114) are suspended at the upper ends thereof from two of the longitudinal members 115 by a pair of bars 122, and, near the lower ends thereof by a further pair of bars 123 (only one of each pair is visible in FIG. 17). Each of the bars 122 and 123 is pivotally attached at one end thereof to a longitudinal member 115 and at the other end thereof to one of the inclined bars 118 to allow movement of the inclined bars 118 in response to a horizontal force. The inclined bars 118 are shown connected together and caused to move in unison by a plurality of lateral rods 121, as shown in FIGS. 18 and 22.

A longitudinal force upon a rod 120, as previously mentioned, occurs when a key 4, as shown in FIG. 19, is fitted into a slot 102, which extends uniformly the length of a receiver 102', and continued longitudinal movement thereof brings the forward end 29 of the key 4 into contact with the rod 120 thereby causing the rod 120 and the key-blank-removal means 112 associated therewith to move longitudinally forward. The key-blank-removal means 112 in its forward longitudinal travel contacts one of the lateral cross rods 121 and any further movement thereof results in like movement of the lateral rod 121 and the inclined bars 118. However, the inclined bars 118 are unable to move because the shaft, shown at 111', of the solenoid 111 engages one of them, by extending through a perforation therein, as shown in FIGS. 2 and 21, thus rendering the key-blank-removal means 112 ineffective. The shaft 111' is withdrawn when the circuit to the solenoid 111 is energized, in a manner to be explained more fully in connection with the circuit diagram in FIG. 2, and the inclined bars 118 are free to move longitudinally forward in response to the horizontal force on the rod 120. In actual practice the rods 120 need not be horizontal, but may, in fact, incline slightly from the horizontal, and, as can be readily appreciated, the path of travel of the inclined bars 118 will be an arc in the manner of a pendulum, except of course, the inclined bars are dependent from two points by bars 122 and 123. The arc described is small, movement being approximately one-half inch, so it may be described as horizontal. And further, the rods 120 may be replaced by a series of solenoids one of which may be energized when a key is inserted into a slot 102 in the manner herein described.

As the inclined bars 118 move forward, a pawl 124 pivotally attached to the lower end of one of the inclined bars 118 travels from a circular indent 126 to a further circular indent 126' across notches 125' of a stationary member 125. The stationary member 125 is so located that the pawl 124, as it engages a notch 125', is inclined slightly from the vertical in the direction of travel and movements, forward or reverse, cannot be reversed once the pawl 124 has engaged a notch 125', and, therefore, longitudinal travel of the inclined bars 118, once begun, cannot be reversed until the pawl 124 reaches the indent 126' in forward movement or the indent 126 in reverse movement, the concavities of the indents 126 and 126' being sufficient to allow such reversal. When the key-blank-removal means 112 has reached its farthest point of forward travel and a key blank 4' has been ejected, it is desirable to render the dispenser portion of the vending apparatus I ineffective in order to prevent the removal of more than one key blank upon the insertion of only one coin. It is also desirable at this point to render the key-blank-contouring mechanism II effective in order that the ejected key blank may be contoured to the outline of the key. In the apparatus of the present invention a switch 1227, connetced with and controlled by the effective key-blank-removal means 112, serves to render the dispenser portion ineffective and thereupon render the key-blank-contouring apparatus II effective. This is effected by a horizontal rod 174' which may be attached, for example, to one of the inclined bars 118 and which, near the end of the forward travel of the inclined bar 118, engages the switch 127, thus, as will be explained in connection with FIG. 2, rendering the dispenser portion ineffective and the key-blank-contouring mechanism II effective.

In the absence of means for preventing such an occurrence, it would be possible to obtain more than one key blank 4' by inserting more than one key 4 into more than one slot 102 and simultaneously moving all of the inserted keys 4 forward. Angle members 130, attached to each of the key-blank-removal means 112, acting in combination with a hollow tube 133 and associated elements act to guard against such an occurrence. As a key-blank-removal means 112 moves forward, in the manner previously described herein, the angle member 130 associated therewith, as best shown in FIG. 22, moves into a notch 131 in the hollow tube 133. A plurality of solid members 132, preferably of the same shape as the inside periphery of the hollow tube 133, are loosely fitted therein to allow movement axially thereof. The length of the solid members 132, except for the solid members at the ends of the tube 133, is preferably such that a solid member 132 will extend from the center of one notch 131 to the center of the next adjacent notch 131. Stops, not shown, limit the axial movement of each of the solid members 132. The ends of the solid members 133 may be rounded or chamfered slightly to allow entrance of the apex of the angle member 130 to spread adjacent solid members 132 apart as the angle member 130 travels forward. The total length of solid members 132 within the hollow tube 133 is less than the length of the hollow tube 133 a sufficient amount to allow the entrance into a slot 131 of one angle member 130 a sufficient distance to eject a key-blank 4'. The solid members 132 are moved axially within the tube 133 by entrance of an angle member 130, and, therefore, each presents a solid surface to the apex of the angle member 130 associated therewith, thus preventing the entrance of any other angle member 130 into the corresponding slot 131. Two springs 135 (only one is shown herein) return the solid members 132 to their original positions once the force thereon is removed. In the embodiment of the invention herein described there is a plurality of hollow tubes 133 and the axial movement of the solid members 132 in any one hollow tube 133 is transmitted to all of the other hollow tubes 133 by levers 133' so that only one key-blank-removal means 112 can move forward a sufficient distance to effect ejection of a key blank 4'. A solid member 103', substantially thicker than a key blank 4' prevents complete forward movement of the key-blank-removal means 112 when the container 103 associated therewith is empty.

It now remains to explain an electrical circuit arrangement whereby the operations of the vending apparatus I are effected and this explanation will be made in connection with FIG. 2. Power, which may be, for example, at 120 volts A.C., may be delivered to the vending apparatus II through a plug 168 as is well known. The electrical circuit shown, comprises one power line, return being effected through the various members of the vending apparatus II which may be, for the most part, made of metal, and this return is shown in FIG. 2 as a conventional ground connection. Power is fed from the plug 168 through a conductor 145 to a switch 88, the operation of which will be described hereinafter, thence through conductors 151, 172, 152 and 190 to the switch 109. The switch 109 is coin-controlled, being momentarily closed as the coin 146 falls, after being inserted into the slot 101', on its way to a collection container, not shown; deformed coins by-pass the switch 109 and may be recovered at a coin return 136. Upon the momentary closing of the switch 109, power may be fed through conductors 154 and 173 thus energizing the coil of a normally open relay 148 causing the contacts of the relay 148 to close. Power then may be fed from the conductor 152 through a conductor 174, through the contacts of the relay 148 to a conductor 143 and the switch 127 and thence to conductors 144, 153 and 173, thus maintaining the energization of the holding coil of the relay 148 after the switch 109 opens. Power also may be fed along conductor 144 to the holding coil of the solenoid 111 effecting withdrawal of the shaft 111' thereof from within the perforation in the inclined bar 118, and the inclined bars 118 and lateral bars 121 are, at this point, free to move longitudinally forward in response to pressure upon the key 4 in the manner hereinbefore explained. The horizontal bar 174', upon forward movement of the bar 118 in the course of removing a key blank 4', as previously explained, effects movement of the switch 127 to a second position so that electrical connection between contact points 175 and 175' is broken and contact is made between contact points 176 and 176'. In this manner the electric circuits in the dispenser portion of the vending apparatus I are de-energized and the electric circuits in the key-blank-cutter II are energized. Power is thereby removed from the holding coil of the solenoid 111, which in the process returns to its initial state and in response to a spring, not shown, that shaft 111' extends, fitting into the perforation in the inclined bar 118 when the perforation and the shaft become aligned upon the return of the bar 118 to the position shown in FIG. 2 in response to the returning force of a spring 129.

Figure 14:
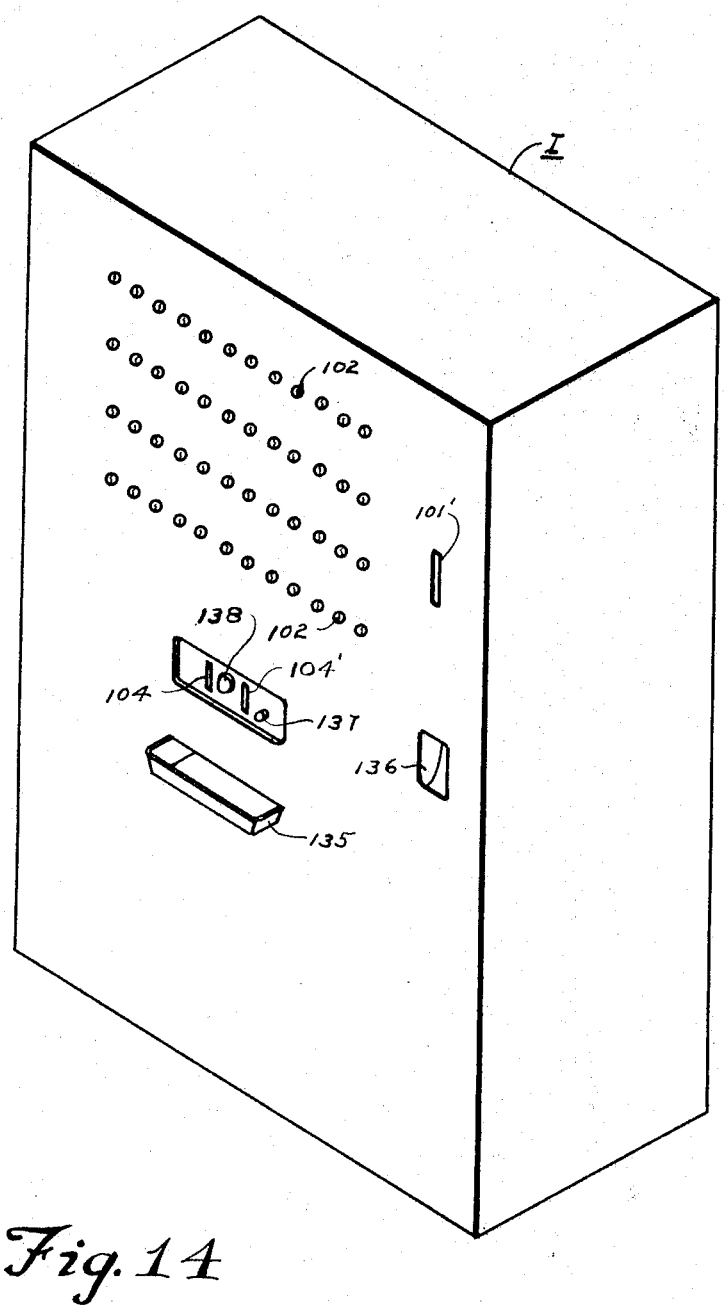
FIG. 14 is a view similar to FIG. 1 of a preferred modification adapted for operation with the circuit of FIG. 2.
Figure 15:
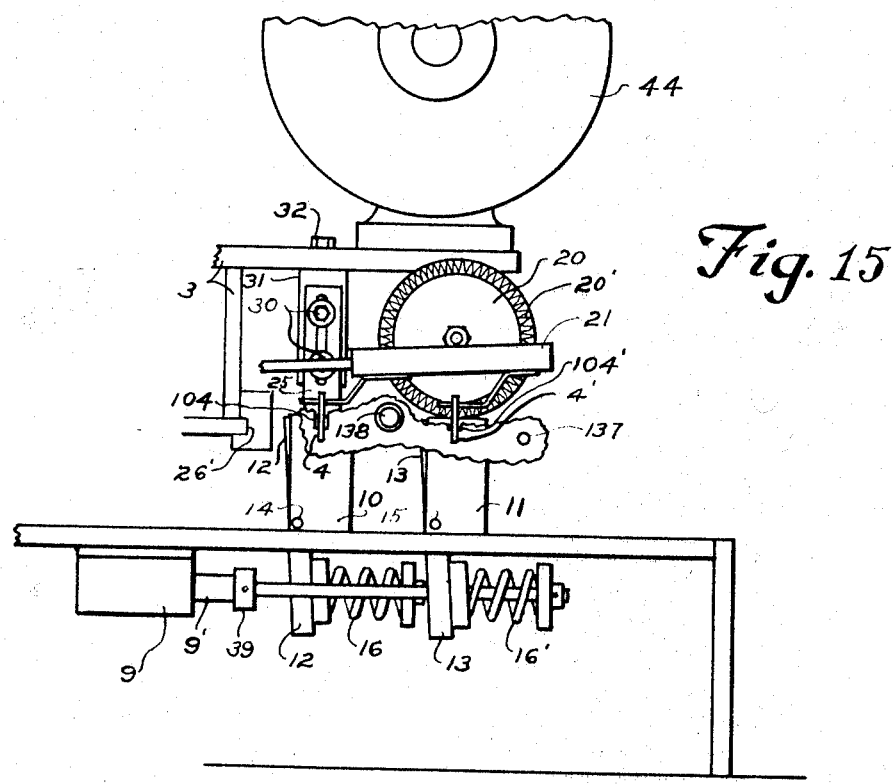
FIGS. 15 and 16 are partial front views of a portion of apparatus shown in FIG. 14, most of the front panel of the embodiment being cut away to expose the key-blank-cutter apparatus.
Figure 16:
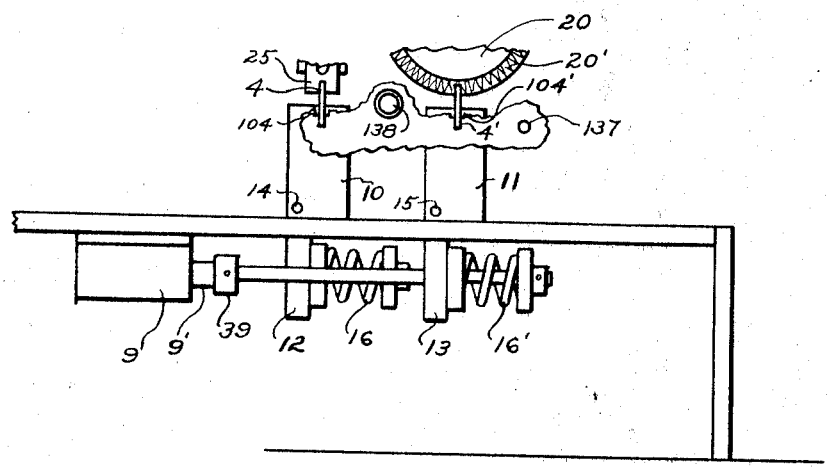

Upon closing of the electric circuit between contact points 176 and 176', power may be fed from the conductor 151 along a conductor 178, through the contact 176' to 176 and thence along a conductor 179 to energize a coil 160 which, when energized, retains the switch 127 in the second position against the returning force of a spring 127'. Power may now be fed from the conductor 179 along a conductor 161 to the primary winding of a transformer 90 which may be used to step the voltage from the 120 volts at the input to, for example, 12 volts for safety purposes. Power may then be taken from a secondary terminal 163 of the transformer 90 along a conductor 165 to the switch 166. The switch 166 is normally open, but, as previously explained, it is closed when the key 4 is properly seated within the vise 10. Power may, when the switch 166 is thus closed, be fed along a conductor 170 to a further switch 167 which is similar to the switch 166, but which is closed upon the proper seating of the key blank 4'. Upon the closing of the switches 166 and 167 power may be fed along conductors 171 and 169 to a lamp 138 and thence along conductors 179 and 180 to the second terminal of the transformer 90, shown at 164. Power may also be fed, upon the closing of switches 166 and 167, from the conductor 171 along a conductor 156 to a switch 137 (the lamp 138 and the switch 137 are shown in FIG. 14 on the front panel of the vending apparatus I), which may be momentarily closed to allow power to flow along a conductor 157 to the coil of a normally open relay 138 and thence through a conductor 158 to the conductor 180 and to the terminal 164. The relay 139, upon being energized, closes and power may then be fed from the conductor 172 along conductors 181 and 182, through the closed contacts of the relay 139 and thence along conductors 183 and 184 to energize a normally open relay 140. The relay 140 is closed upon being energized and power may then be fed from the conductor 181 along a conductor 185 and through the now closed contacts of the relay 140, along conductors 186, 187, 188 and 184 to the holding coil of the relay 140 to retain the contacts of the relay coil 140 in the closed position after the switch 137, which, as previously mentioned, is only momentarily closed, is allowed to return to its normally open position. Power may now be fed from the conductor 187 along a conductor 189 to energize the motor 44 and at the same time power will flow through a parallel circuit, comprising a conductor 159, to energize the coil of the solenoid 9. When the coil of the solenoid 9 is thus energized, the core thereof withdraws into the coil pivoting the levers 12 and 13 in a clockwise direction, as has been previously mentioned, and locking the vises 10 and 11. The key-blank-cutter apparatus II then proceeds through a cycle of operation, in the manner previously described, and during this cycle the gear 52 makes one complete revolution. The cycle is determined by the opening of the normally closed switch 88 (see FIGS. 2 and 12), this being effected by an arm 84 which contacts a lever 85 pivoting the latter at pivot point 86', of a support 86, in a clockwise (counterclockwise in FIG. 12) direction to force the shaft 87 upward (downward in FIG. 12) and thus open the normally closed switch 88. Since the switch 88 is in the main circuit and all power passes through it, the opening thereof serves to render ineffective and to reset the electrical circuit of the vending apparatus I. Inertia carries the arm 84 past the lever 85 and the apparatus I is thereafter effective for another cycle of operation.

Modifications of the invention, in addition to those herein described, will occur to those skilled in the art and all such modifications are considered to fall within the spirit and scope of the present invention as defined in the appended claims.

What is claimed is:

1. Apparatus of the character described having, in combination, a key-blank container, normally ineffective key-blank-removal means cooperative with the container and that, when rendered effective, is actuated to remove a key-blank from the container, means for rendering the key-blank-removal means effective, a normally ineffective key-blank contouring apparatus that, when rendered effective, is actuated to contour the removed key blank, and means connected with and controlled by the effective key-blank-removal means for thereupon rendering the contouring apparatus effective.

2. Apparatus of the character described having, in combination, a key-blank container, normally ineffective key-blank-removal means cooperative with the container and that, when rendered effective, is actuated to remove a key blank from the container, coin-controlled means for rendering the key-blank-removal means effective, a normally ineffective key-blank contouring apparatus that, when rendered effective, is actuated to contour the removed key blank, and means connected with and controlled by the effective key-blank-removal means for thereupon rendering the contouring apparatus effective.

3. Apparatus of the character described having, in combination, a key-blank container, normally ineffective key-blank-removal means cooperative with the container and that, when rendered effective, is actuated to remove a key blank from the container, means for rendering the key-blank-removal means effective, a normally ineffective key-blank contouring apparatus that, when rendered effective, is actuated to contour the removed key blank, means connected with and controlled by the effective key-blank-removal means for thereupon rendering the contouring apparatus effective and means for presenting the removed key blank to the key-blank contouring apparatus.

4. Apparatus of the character described having, in combination, a key-blank container, key-blank-removal means cooperative with the container that is actuated to remove a key blank therefrom, solenoid means that, when in one state of energization, renders the key-blank-removal means ineffective to remove the key blank from the container, switch means for changing the state of energization of the solenoid means to render the key-blank-removal means effective, normally ineffective key-blank contouring apparatus that, when rendered effective, is actuated to contour the removed key blank, and means connected with and controlled by the effective key-blank-removal means for thereupon rendering the contouring apparatus effective.

5. Apparatus as claimed in claim 4 in which the switch means is coin-controlled.

6. Apparatus of the character described having, in commbination, a key-blank container, key-blank-removal means cooperative with the container that is actuated in response to a key remove a key blank, of the same shape as the key, from the container, a solenoid that, when de-energized, renders the key-blank-removal means ineffective to remove the key blank from the container, normally open switch means that is closed to permit the energization of the solenoid to render the key-blank-removal means effective, normally ineffective key-blank contouring apparatus that, when rendered effective, is actuated to contour the removed key blank, and means connected with and controlled by the effective key-blank-removal means for thereupon rendering the contouring apparatus effective.

7. Apparatus of the character described having, in combination, a key-blank container, normally ineffective key-blank-removal means cooperative with the container and that, when rendered effective, is actuated to remove a key blank from the container, a normally de-energized electric circuit that, when energized, renders the key-blank-removal means effective to remove a key blank from the container, coin-controlled means for energizing the electric circuit, a key-blank-cutter mechanism, a further normally de-energized electric circuit that, when energized, operates the key-blank-cutter mechanism, and means connected with and controlled by the effective key-blank-removal means for thereupon energizing the said further electric circuit.

8. Apparatus as claimed in claim 7 and in which there is provided means operable when the key-blank-cutter mechanism has completed a cutting cycle for thereupon de-energizing the said further electric circuit.

9. Apparatus of the character described having, in combination, a key-blank container, normally ineffective key-blank-removal means cooperative with the container and that, when rendered effective, is actuated to remove a key blank from the container, a normally de-energized electric circuit that, when energized, renders the key-blank-removal means effective to remove a key blank from the container, coin-controlled means for energizing the electric circuit, a key-blank-cutter mechanism, a further normally de-energized electric circuit that, when energized, operates the key-blank-cutter mechanism, and means connected with and controlled by the effective key-blank-removal means for thereupon energizing the said further electric circuit, the key-blank-cutter mechanism comprising vise means for receiving a key blank and a key, resilient means for securing the key blank and the key within the vise means prior to locking the same, means for assuring proper alignment of the key blank and the key prior to locking the vises, means for locking the vises, means for cutting the key blank to the contour of the key, and means operable following the cutting for automatically unlocking the vises.

10. Apparatus of the character described having, in combination, a key-blank-container, normally ineffective key-blank-removal means cooperative with the container and that, when rendered effective, is actuated to remove a key blank from the container, a normally de-energized electric circuit that, when energized, renders the key-blank-removal means effective to remove a key blank from the container, coin-controlled means for energizing the electric circuit, a key-blank-cutter mechanism, a further normally de-energized electric circuit that, when energized, operates the key-blank-cutter mechanism, and means connected with and controlled by the effective key-blank-removal means for thereupon energizing the said further electric circuit, the key-blank-cutter mechanism comprising a pair of longitudinally extending vises disposed in a pair of spaced parallel planes, for respectively receiving a key and a key blank, resilient members extending transversely to the vises for stabilizing and aligning the key and the key blank, a follower disposed transversely to the plane of the key-receiving vise and movable longitudinally forward and rearward over the top of the same, a cutter wheel disposed and rotatable in a plane transverse to the plane of the key-blank-receiving vise and movable longitudinally forward and rearward over the top of the same, means for locking the vises, means for moving the resilient members away from the tops of the key and the key blank, means for moving the follower and cutter wheel in unison longitudinally forward and rearward over the vises to cut the key blank to the contour of the key, and means operable following the cutting for applying the resilient members to the key and the key blank, and means for thereafter opening the vises.

11. A key duplicating machine, comprising, in combination; key receiving means for receiving and clamping a key of which a duplicate is to be made; key cutter motor means; clamping means for clamping a duplicate key blank in a position adjacent to said key cutting motor means; a control stylus positioned to engage said key in said key receiving means; mounting means enabling relative motion between said stylus and said key receiving means to take place, said mounting means effecting identical relative motion between said key cutting motor means and said clamping means; automatic means for actuating said clamping means, key cutting motor means, and mounting means after a key has been received in said key receiving means to cause said stylus to follow the indentations in said key received in said key receiving means and through said mounting means to effect cutting of identical indentations in said duplicate key blank; said automatic means being responsive to reception of a key in said key receiving means to actuate said clamping means, key cutting motor means, and mounting means.

12. A key duplicating machine, comprising, in combination; key receiving means for receiving and clamping a key of which a duplicate is to be made; key cutter motor means; clamping means for clamping a duplicate key blank in a position adjacent to said key cutting motor means; a control stylus positioned to engage said key in said key receiving means; mounting means enabling relative motion between said stylus and said key receiving means to take place, said mounting means effecting identical relative motion between said key cutting motor means and said clamping means; automatic means for actuating said clamping means, key cutting motor means and mounting means after a key has been received in said key receiving means to cause said stylus to follow the indentations in said key received in said key receiving means and through said mounting means to effect cutting of identical indentations in said duplicate key blank; and coin receiving means, said automatic means being actuated only in response to reception of a coin in said coin receiving means and reception of a key in said key receiving means.

13. A key cutter device for duplicating a key having transverse shoulder portions comprising a clamp member aranged to hold a key and a key blank, abutment portions on said clamp against which said shoulder of said key and blank, respectively, may be shifted for longitudinal positioning of said key and blank, contact means operatively associated with said abutment means arranged to be shifted to circuit closing position against second contact means by insertion of said key and blank, respectively, a tracer and cutter assembly cyclically moveable into operative association with said key and blank, respectively, and a series connected actuator circuit arranged, upon closing, to initiate said operative cycle, said circuit including as conductive portions thereof said first and second contact means of each said clamp.

14. A key cutter device for duplicating a key having transverse shoulder portions comprising a clamp member arranged to hold a key and a key blank, abutment portions on said clamp against which said shoulder of said key and blank, respectively, may be shifted for longitudinal positioning of the latter, a tracer and cutter assembly cyclically movable into operative association with said key and blank, respectively, and a series connected actuator circuit arranged upon closing, to initiate said operative cycle, said circuit including as a conductive portion thereof a contact operatively associated with each said abutment portion.

15. A cutter device in accordance with claim 14 wherein said contacts are disposed in the path of movement of the transverse shoulder portions of said key and key blank, respectively.

16. In a key cutting device including means for shifting a coordinated key tracer and key cutter in guided relationship to a shouldered key and key blank, respectively, clamp means for positioning and holding said key and key blank comprising spaced seats for said key and key blank, a temporary hold down member disposed adjacent each said seat in key depressing relationship thereto, means for shifting said hold down members clear of said seats in advance of the start of a cutting cycle, contact means on each said hold down member electrically isolated from said seats and located to engage a leading shoulder portion of a properly inserted key and key blank in the seat adjacent position of said members, and a series connected actuating circuit for initiating said cutting cycle including as a conductive portion thereof said contact means.

References Cited

UNITED STATES PATENTS

| 2,057,301 | 10/1936 | Golokow et al. | 90—13.05 |
| 2,148,667 | 2/1939 | Yoskowitz et al. | 221—122 |
| 2,975,935 | 3/1961 | Hebel | 194—10 |
| 2,148,668 | 2/1939 | Yoskowitz et al. | 90—13.05 |
| 2,645,978 | 7/1953 | Sejarto et al. | 90—13.05 |

GERALD A. DOST, *Primary Examiner.*

U.S. Cl. X.R.

221—87, 135